Aug. 8, 1967    J. PERNER ET AL    3,334,543
APPARATUS FOR THE PRODUCTION OF PHOTOGRAPHIC COPIES
Filed Feb. 8, 1965    6 Sheets-Sheet 6
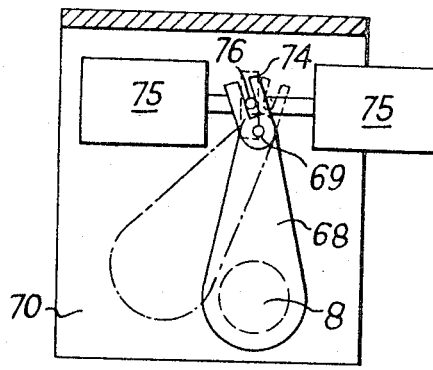
Fig.11.
Fig.14.
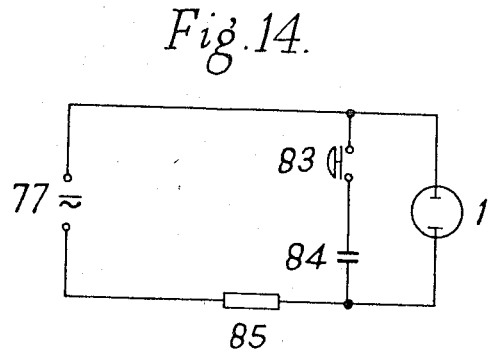
Fig.12.    Fig.13.
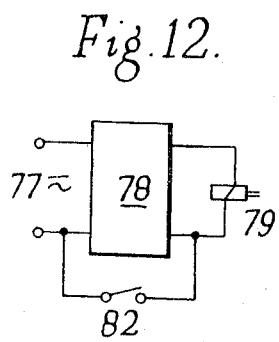
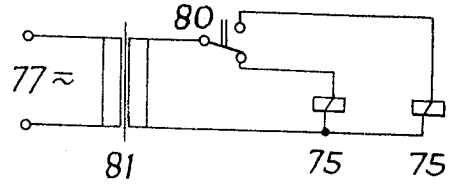
INVENTORS
JOHANN PERNER, CLAUS DONATH,
ERICH KORF AND SIEGFRIED HAINY
BY
Irvin S. Thompson
ATTORNEY

United States Patent Office 3,334,543
Patented Aug. 8, 1967

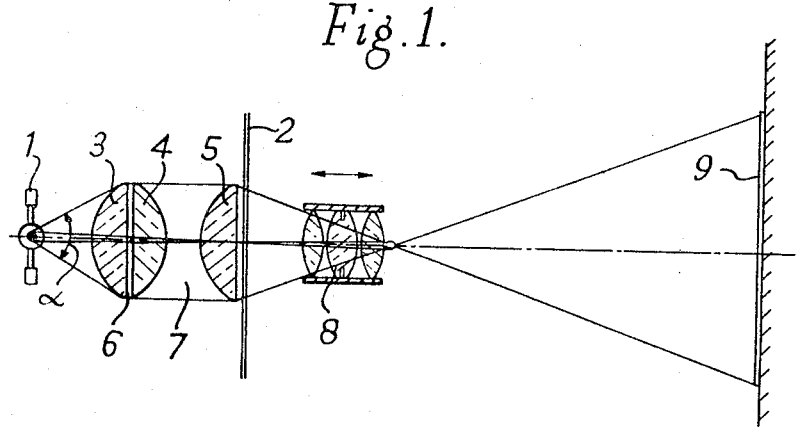
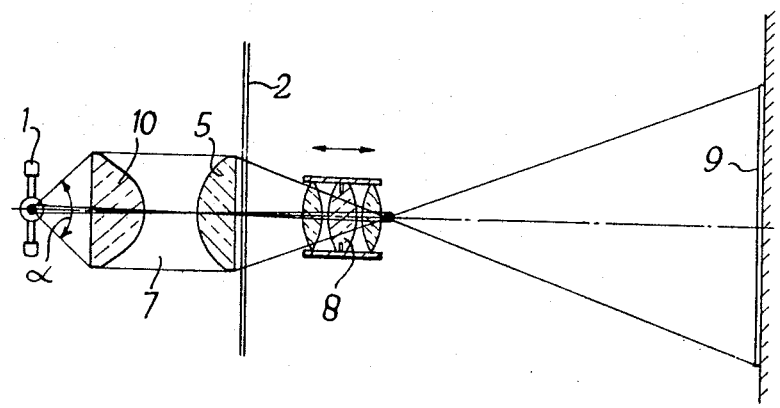

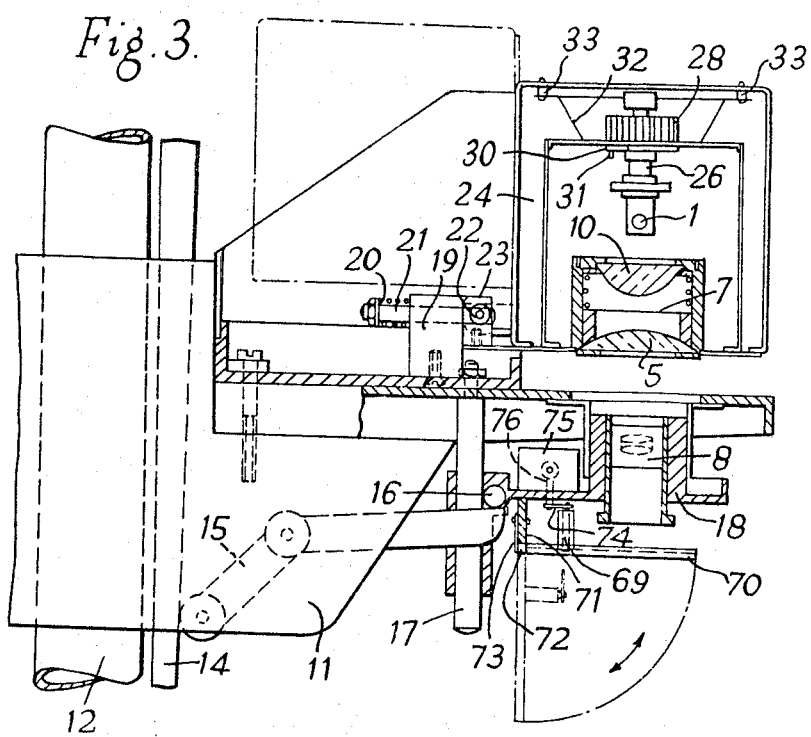
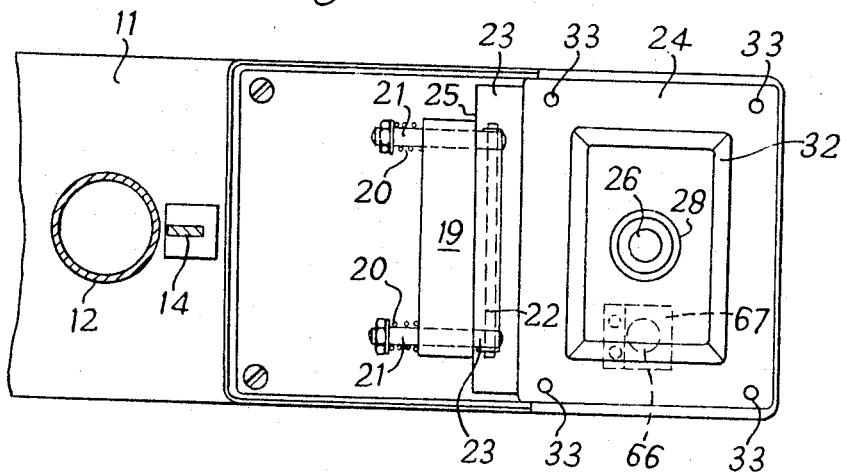

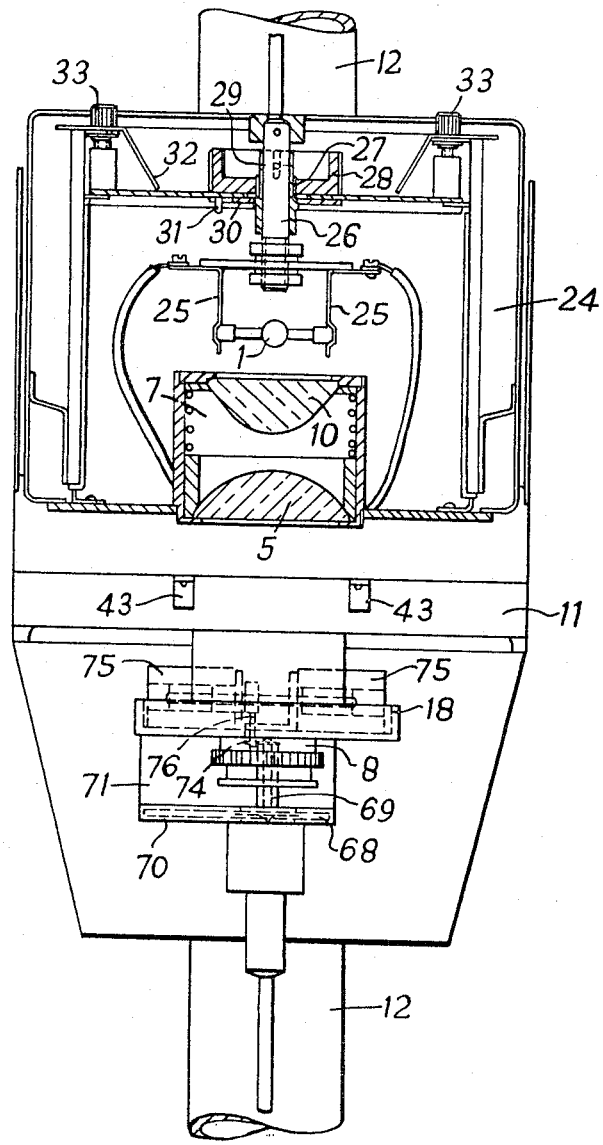

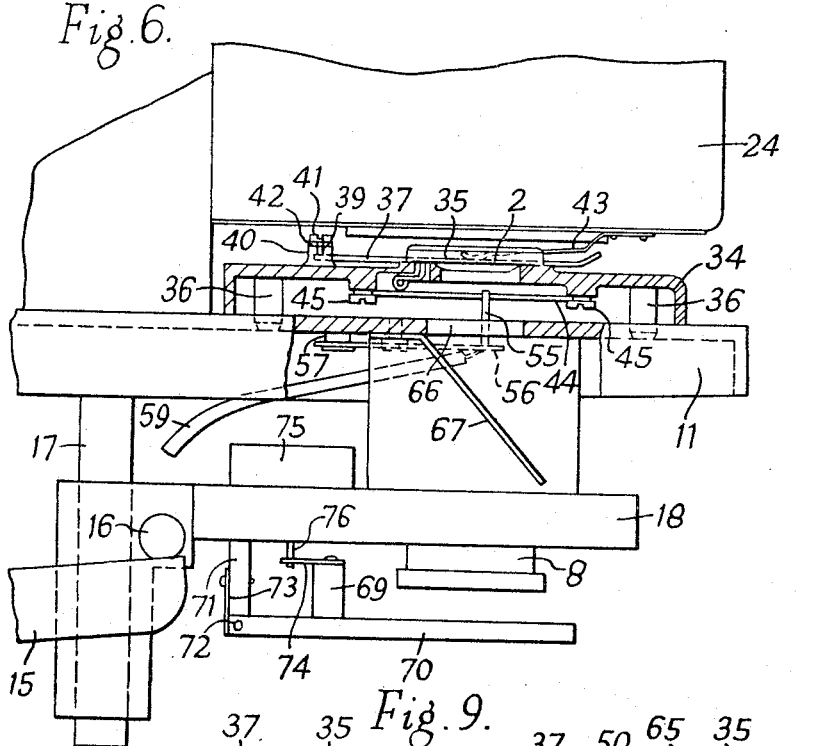
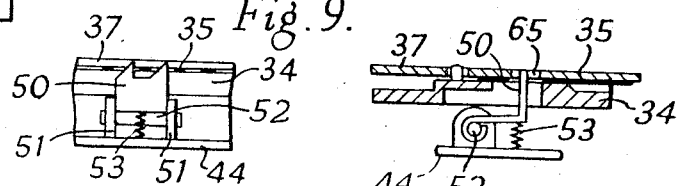
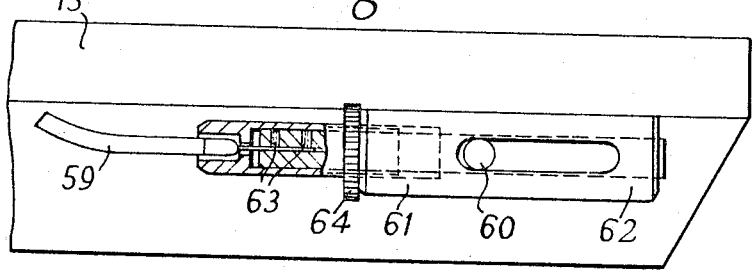

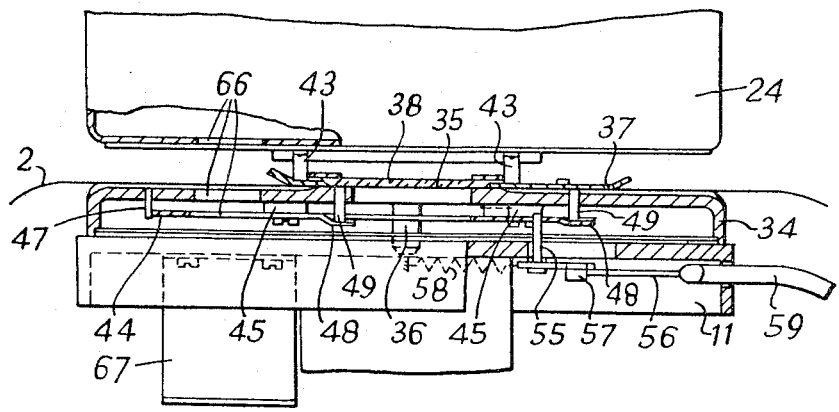
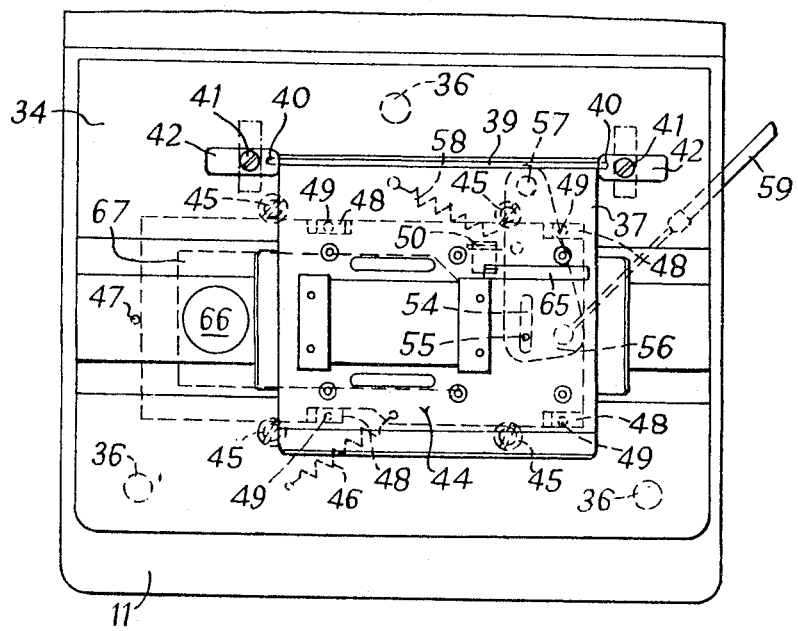

3,334,543
APPARATUS FOR THE PRODUCTION OF PHOTOGRAPHIC COPIES
Johann Perner, Berlin-Adlershof, and Claus Donath, Erich Korf, and Siegfried Hainy, Dresden, Germany, assignors to Veb Pentacon Dresden Kamera- und Kinowerke, Dresden, Germany
Filed Feb. 8, 1965, Ser. No. 431,105
9 Claims. (Cl. 88—24)

The invention relates to an apparatus for the production of photographic copies, particularly in dimmed daylight and/or artificial light.

Appliances are already known for the production of photographic copies and enlargements, in which the enlargement system consists of a light source, a condenser, a negative support and a projection lens, by which the image of the illuminated negative is then produced, on the scale of the enlargement to which the apparatus has been set, on the photo-sensitive copying material resting on a base. The light sources used in this connection are incandescent lamps which are readily obtainable, while ordinary silver chloride papers were employed as copying material.

The main drawback of these known appliances, using an incandescent lamp and normal silver chloride paper, resides in the fact that the operation has to be continually carried out in darkened rooms, with a feeble red and green light, and such work, particularly when it extends over a long period, causes increased physical and mental strain to an operator. In a dark room, moreover it is difficult to verify whether the correct exposure and development time have been selected, because the result cannot be seen until after the fixing of the exposed prints. Furthermore, fairly long exposure, developing, fixing and washing times are involved, and the photographic paper used must be comparatively thick and its gelatine coating has a high silver content.

In the meantime, in addition to the usual commercial incandescent lamps, the so-called high pressure mercury vapour lamps for ultra-violent radiation (U.V.) absorbing a power of 50–500 w., have also been developed for illumination purposes, and under certain conditions they are also suitable for use as a source of light in an enlarging apparatus. Attention has also been devoted to the production, for enlargements, of photographic copying material which is rendered sensitive by treatment with chemical solutions and which, owing to its low sensitivity to visible light, is intended to make it possible for enlarging and developing operations in a lighted instead of a darkened room.

None of these suggestions, however have found a footing in practice to the extent intended, this being mainly due to the fact that in the enlarging apparatus hitherto known do not use high pressure mercury vapour lamps in place of incandescent lamps or copying material with low sensitivity to visible light, either alone or in combination.

The purpose of the invention is to provide an apparatus for the production of photographic duplications, avoiding the drawbacks described in connection with the known devices and processes, characterised by a simple structure and easy method of operation, and enabling photographic duplications to be produced in dimmed daylight and/or artificial light on financially economical and time saving lines. The invention is based on use of ultraviolet high pressure mercury vapour lamps which are already known in themselves and a photo-sensitive copying material with a silver base.

The object of the invention is an apparatus for making photographic copies and enlargements having an ultraviolet high pressure mercury vapour lamp, a condenser, permeable to U.V. light in the range 300 to 400 nanometres (1 nanometre=$10^{-9}$ metres), with two parts, a first lens system and a second lens system separated by an airgap, a projection lens permeable to U.V. light in the range 300 to 400 nanometres and an electro-magnetically operated shutter; all arranged along the optical axis of the equipment.

Another object of the invention is an apparatus for making photographic copies having a two part condenser in which the first lens system comprises two spherically planoconvex lenses having their flat sides adjacent each other with an airgap therebetween and the second lens system comprises one spherically planoconvex lens, the flat side of which faces away from said first lens system.

A further object of the invention is an apparatus for making photographic copies having a two part condenser in which the first lens system comprises one plano-non-spherical lens having its flat side to the lamp and the second lens system comprises one spherically planoconvex lens, the flat side of which faces away from said first lens system.

In accordance with the combination provided by the invention and explained here, the light source used will be a high pressure mercury vapour lamp for U.V. radiation and absorbing a low power of only 50 w. As both the condenser system and the projection lens are permeable to U.V. rays of 300 to 400 nanometres and as the copying material used is highly sensitive to these U.V. rays, the result in an advantageous mutual coverage between the range of the spectral emission of the high pressure mercury vapour lamp and that of the spectral sensitivity of the copying material. This results in the advantage of a low-power absorption by the high pressure mercury vapour lamp, a low temperature rise in the enlarging system and the negative and also short exposure times in the copying process. As this process enables use to be made of copying material with a steep contrast curve, almost insensitive to yellow and completely insensitive to orange and red, the copying operation can be carried out without a filter in a room with dimmed incandescent lamps or fluorescent lamps.

The spectral range used in the invention is approximately between 300 and 400 nanometres. It is thus narrower than in the enlarging systems hitherto customary. This reduces the effect of colour faults in the lens, so that inexpensive lenses can be used for the projection. Due to the small dimensions of the focal spot produced by the high pressure mercury vapour lamp and the fact that this focal spot is reproduced under the plane of the lens, preference is given to the use of those zones of the lens which are in the vicinity of its axis. This reduces the apertural defects of the lens, and for this reason likewise inexpensive lenses can be used for the projection.

Further features of the invention will be explained in the following description of a preferred constructional example, of which schematic diagrams are given in the drawing. These details which are not essential to the comprehension of the invention have not been explained and illustrated.

The drawings are as follows:

FIGURE 1 is a schematic diagram of the optical enlarging system with a use of a two-part condenser consisting of three lenses.

FIGURE 2 is a schematic diagram of an optical enlarging system with the use of a condenser consisting of two lenses.

FIGURE 3 relates to the apparatus for photographic duplication and provides a lateral and part sectional view of the vertically adjustable support with the illuminating head and the enlarging system.

FIGURES 4 and 5 are a plan view and a front view respectively of the apparatus shown in FIGURE 3, with the illuminating and enlarging system shown partly in the section.

FIGURES 6 to 8 are further diagrams and sectional drawings of part of the vertically and enlarging system with an interchangeable negative support and the film transport device.

FIGURE 9 shows details of the film transport claw.

FIGURE 10 shows, arranged on the working surface of the support for the copying material, the device for operating the film transport.

FIGURES 11 to 13 provide a diagram of the electromagnetic shutter control.

FIGURE 14 is an electrical circuit diagram for the HPMV lamp.

In the optical illuminating and enlarging system shown schematically in FIGURE 1, 1 is a 50 w. high pressure mercury vapour lamp. Between this lamp and the negative 2 there is a two-part condenser which is permeable to U.V. rays in the range of approximately 300 to 400 nanometres and which includes three spherically planoconvex lenses 3, 4 and 5. The two lenses 3 and 4 are mounted with their flat sides adjacent each other and with a small air gap 6 therebetween, to form a preliminary condenser, and the third lens 5, which is separated from the foregoing by an airgap 7 and functions as a main condenser, is arranged with its flat side to the negative 2. Between the negative 2 and the photosensitive material 9 there is provided a projection lens 8, which is likewise peameable to U.V. rays in the rate of 300 to 400 nanometres. The U.V. rays produced by the high pressure mercury vapour lamp 1 are collected by the two-part condenser consisting of the lenses 3, 4, 5 and illuminate the negative 2, and the image of the latter is projected by the projection lens 8, in accordance with the enlarging scale selected, onto the photo-sensitive copy material 9.

In the invention the high pressure mercury vapour lamp 1, the two-part condenser 3–7 and the projection lens 8 are so arranged that the focal spot produced by the high pressure mercury vapour lamp is reproduced behind the plane of the lens and in a zone of the lens 8 which is in the vicinity of the axis. The apertural error of the lens is therefore only slight, and inexpensive lenses can be used for the projection. For the purpose of sharp focussing, the projection lens 8, as indicated by the arrow, can be adjusted in a direction along the optical axis of the enlarging system, which in turn is adjustable as a whole, in order to vary the enlarging scale.

In the illuminating and enlarging system shown schematically in FIGURE 2, the invention provides for the use of a condenser having two lenses which are permeable to U.V. rays in the range of approximately 300 to 400 nanometres. In this case one lens 10 is plano-nonspherical and corresponds on the flat side to the high pressure mercury vapour lamp 1, while the other lens 5, separated from this lens 10 by an airgap, is spherically convex and has its flat side to the negative 2. Since in this condenser the angle of the rays from the high pressure mercury vapour lamp 1 to the flat surface, facing towards it, of the nonspherical lens is greater than in the system shown in FIGURE 1, this enables a correspondingly greater concentration of the light, with a corresponding reduction in the exposure time.

FIGURES 3–10 show a constructional example of an apparatus for the production of photographic duplications with the use of an illuminating and enlarging system such as that shown schematically in FIGURE 2. In this case the diagram illustrates a vertically adjustable support 11 which carries the illuminating and enlarging system. The support 11 is guided by a column 12, which is affixed to a base-plate (not shown). To the column 12 is attached a curved bar 14, and the sharp focussing of the lens 8 is effected by this bar and the control lever 15, which engages the pin 16 of the lens holder 18, which can be adjusted in its position along the guide 17.

On the top of the support 11 there is a bearing 19, in which are mounted two movable joint bolts 21 and which are acted on by springs 20. A shaft 22 of hinge 23 is connected with these two bolts and about which the illuminated head 24, which is attached to hinge 23, can be pivoted. In the operating position, shown in FIGURE 3, the illuminating head 24 is pressed by the end of the hinge 23 against bearing 19, by the action of the springs 20. The illuminating head 24 can be swivelled upwards from this operating position into the position shown by the dotted lines in FIGURE 3, and in this process the upper lateral surfaces of the hinge 23 are pressed against the bearing 19 by the action of the springs 20. This construction, provided by the invention, ensures that the illuminating head 24 is force-locked both in the pivoted position and in the operating position, the springs 20 being made strong enough to ensure that the illuminating head 24, when in the operating position, will at the same time press a pressure plate 37 (FIGURES 6, 7, 8 and 9) on the negative 2, without recourse to an otherwise necessary interlocking system.

In the illuminating head 24, the interchangeable high pressure mercury vapour lamp 1, as shown in particular in FIGURE 5, is held by two electrically conductive contact springs 25, which are conductively connected with a choke coil shown in FIGURE 14. According to the invention, the contact springs 25 are affixed to an adjusting bolt 26, so that they are insulated, the adjusting bolt being mounted so that it cannot rotate, in a collet 29 provided with screw thread 27 and milled nut 28, and being adjustable in an axial direction. The collet 29 rests by a disc shaped collar 30, which is secured against rotation by a slotted tab guide 31, against the bottom of a cup-shaped cover 32, which has an enlarged bore giving passage to the collet 29. The construction thus provided by the invention enables the high pressure mercury vapour lamp 1 to be adjusted in the direction of the optical axis and also enables it to be centered in respect of the axis of the enlarging system, the milled nut 28 enabling the lamp to be firmly secured in the correct position selected in each case. Finally, by releasing the four screws 33, the cup-shaped cover 32 can be removed together with the entire adjusting device for the high pressure mercury vapour lamp 1, from the illuminating head, in order to enable the condenser to be cleaned and changed.

A removable and replaceable negative support 34, by which the film 35 to be copied is held and transported, is provided between the vertically adjustable support 11 and the illuminating head 24, as shown in FIGURES 6 to 9. The negative support 34 can be inserted by means of the fitting pins 36 in appropriate borings of the support 11 so as to be removable therefron. Above the negative support 34 there is an interchangeable pressure plate 37 with a glass disc 38, for pressing the film 35 in position and holding it flat. The pressure plate 37 is supported by a hinge pin 39, in grooves of the bearings 40 provided on both sides. On each bearing 40 there is a bolt 42 which can be pivoted about the lamp screw 41. In the position shown in FIGURE 8 the bolts 42 prevent the pressure plate 37 from being extracted, and when the bolts 42 are in the position shown by the dotted line the pressure plate 37 can be withdrawn from the bearings 40. To the bottom of the illuminating head 34 are affixed two leaf springs 43 which act on the pressure plate 37 with the glass disc 38 thus pressing the film 35 against the base of the negative support 34.

On the lower side of the negative support 34 there is a longitudinally moveable film transport side 44 of which both longitudinal edges are guided by shoulder screws 45 and which is moved back by a drawspring 46 against the stop 47. The film transport slide 44 is fitted on both sides with bent control parts 48 which interact with control pins 49 which are moveable perpendicularly in respect of the said control parts and which extend upwards through the negative support 34 and contact the pressure plate 37, as shown in FIGURES 7 and 8. On the film transport slide 44 there is also a film claw 50 which as shown on a larger scale in FIGURE 9, is movably mounted between bearing parts 51 on a bearing pin 52 and of which the transport teeth, urged by a pressure spring 53, engage the perforation of the film 35.

Finally, the film transport slide 44 also has a slot 54 which is engaged by a coupling pin 55 of a lever 56, which is moveable about a bearing bolt 57 underneath the vertically adjustable support 11, and which is moved back by the draw spring 58 into the initial position. To the lever 56 is connected a Bowden cable 59, that is, a stranded steel cable movable in an outer protective cover which can be operated by a handle 60 provided on the side of the base plate 13. The handle 60 is affixed to a cylindrical slide 62 which moves in the side bearing 61 and with which the other end of the Bowden cable 59 is rigidly connected, for example, by clamp screws 63. The slide 62 also has an adjustable stop, taking the form of a milled nut 64.

When the handle 60 is operated the Bowden cable 59 causes the lever 56, connected with it, to move towards the right as shown in FIGURES 7 and 8. In this operation the coupling pin 55 takes the film transport slide 54 along with it, and the film claw 50 of the slide 54 feeds the film 35 forward according to the images required. At the beginning of this movement the control pins 49 are moved upwards, by the control parts 48 provided on the film transport slide 44, and this causes the pressure plate 37 to be lifted off the film 35. The film feed thus takes place without any clamping action being exerted on the film, thus ensuring that the otherwise possible damage to the film is avoided. The transport movement is limited by a slot 65, which is provided on the negative support 34 and the two ends of which are contacted in each case by the film claw 50. When the handle 60 is moved back the control pins 49, which have been lifted by the control parts 48 of the film transport slide 44, will slide back again, and the pressure plate 37 presses the film 35 against the negative support 34. In this return movement the bevelled teeth of the film claw 50 will also move past the bottom of the film 35, so that the latter remains stationary.

According to the invention, there is a detachable coupling connection between the lever 56, provided on the support 11, and the film transport slide 44, via the coupling pin 55, since the latter engages the slot 54 on the said side. This makes it possible for the negative support 34 to be removed and replaced and the film transport device provided on support 11 to be uncoupled at the same time.

The negative gate provided in the negative support 34 and in the pressure plate 37 is constructed to a certain size, e.g. 24 x 36 mm. In the invention, the pressure plate 37 is constructed in such a manner that by pivoting the bolt 42 it can be exchanged for other pressure plates, which are adapted, for example, to a negative size 12 x 18 mm.

When photographic duplications are carried out in dimmed daylight and/or artificial light it is necessary that not only the negative to be duplicated but also the adjacent part of the film should be accessible for observation, in order to ascertain what negative, if any, will be duplicated in the next operation. In the invention this problem is solved by a system in which, as shown by FIGURES 7 and 8, the negative support 34 is provided, to the side of the enlarging system e.g. at a distance of two or three negatives therefrom, with a circular orifice 66, or with one of which the shape corresponds with the negative, while a similar orifice is also provided in the film transport slide 45 and in the support 11. Underneath these orifices and on the support 11 is affixed a mirror 67, inclined at an angle of 45°, through which it is possible to observe the negative or the part of the film situated above the orifices 66. For the illumination of the said negative or part of the film the invention provides for the utilisation of the light which emanates from the high pressure mercury vapour lamp 1 and which, through an orifice 66 provided on the floor of the illuminating head 24, falls onto the part of the film to be observed.

It is known that high pressure mercury vapour lamps are not suitable for direct connection to the mains but require, as these are discharge lamps which have a burner of quartz glass in which the light is produced between the two electrodes by a discharge in mercury vapour, to be connected in series with a choke coil. This process requires a starting time of 4–7 minutes, so that the lamp has to burn throughout the entire operating time and the path for the U.V. rays for the exposure of the copying material must only be opened up for the exposure time necessary for the purpose. In the apparatus to which the invention relates this result is ensured by an electro-magnetically controlled shutter corresponding to the projection lens 8. As shown in FIGURES 3 to 11, this shutter consists of the cover leaf 68, which is pivotably mounted in a bearing bushing 69 of the holder 70. The holder 70 is connected via the link 72, with a bearing part 71 of the lens holder 18. In the invention, the holder 70 with the cover leaf 68 can be swivelled into and out of the path of the rays of the projection lens 18 and is secured in either of these positions by a leaf spring 73 affixed to the bearing part 71. The cover leaf 68 is provided with a fork arm 74 which is engaged by a coupling pin 76 which can be controlled by the two electro-magnets 75.

In the circuit diagram shown in FIGURES 12 and 13 the connections for the mains voltage are marked 77. The mains conductor is guided in an adjustable timing mechanism 78, which controls a relay. The latter is provided with a reversing switch 80, which brings the two electro-magnets 75 into operation alternately. By means of a coupling pin 76, as shown in FIGURE 11, the electro-magnets 75 which are connected with the transformer 81, operate the cover leaf 68 of the shutter and move it, for exposure purposes, into and out of the path of the U.V. rays of the projection lens 8. A further switch 82 is connected across the timing mechanism 78 and when operated enables the cover leaf 68 of the shutter to be permanently released.

FIGURE 14 is a circuit diagram for the high pressure mercury vapour lamp 1.

In this diagram, the connections for the mains voltage are marked 77, while 83 is the switch key, 84 the condenser and 85 the choke coil.

We claim:

1. An apparatus for making photographic copies and enlargements comprising:
   (a) an ultra-violet high pressure mercury vapour lamp mounted transversely to the optical axis of the apparatus and adjustable along said axis,
   (b) a condenser permeable to ultra-violet light in a range of between 300 to 400 nanometres, comprising a first lens system for transforming a diverging beam of light from the lamp into a beam parallel with the optical axis of the apparatus and a second lens system, separated from the first lens system by an air-gap, for transforming said parallel beam of light into a converging beam of light,
   (c) a projection lens, permeable to ultra-violet light in a range of between 300 to 400 nanometres, arranged to receive the converging beam of light from the condenser, which lens is movable in relation to the condenser along the optical axis so that focal spot of the converging beam is reproduced behind the plane of the projection lens,
   (d) a shutter pivotable into and out of the optical axis of the equipment, said shutter comprising a cover leaf, electro-magnets for actuating said cover leaf and a device for adjusting and regulating the exposure time of the beam of light from the projection lens; whereby when the lamp is energised, a negative is placed between the condenser and the projection lens and photo-sensitive copying material is arranged, in accordance with the size of enlargement required, on the optical axis of the equipment and the shutter is pivoted out of the optical axis thereby exposing the copying material for a selected time.

2. An apparatus as claimed in claim 1 wherein said first lens system comprises two spherically planoconvex lenses having their flat sides adjacent each other with an airgap therebetween and said second lens system comprises one spherically planoconvex lens, the flat side of which faces away from said first lens system.

3. An apparatus as claimed in claim 1 wherein said first lens systems comprises one plano-nonspherical lens having its flat side to the lamp and said second lens system compries one spherically planoconvex lens, the flat side of which faces away from said first lens system.

4. An apparatus as claimed in claim 1 having an illuminating head for supporting the lamp and the condenser so as to be removable and replaceable, an adjustable support, a bearing attached to the support, a hinge having stop faces attached to the illuminating head, two movable joint bolts connected to said hinge and passing through bores in said bearing, two springs, each being placed on the portions of the joint bolts protruding from said bearing and two nuts screwed on to the ends of the joint bolts thereby retaining and compressing the springs so that the springs in conjunction with the stop faces of the hinge secure the illuminating head in an operating position and a position in which the lamp and the condenser can be removed from the illuminating head.

5. An apparatus as claimed in claim 4 having two contact springs between which the lamp is held, an adjusting bolt for supporting the contact springs, a collet fitting coaxially about said adjusting bolt so that said adjusting bolt is prevented from rotating, said collet having a screw thread on the external surface thereof, a removable cover of the illuminating head through which said collet protrudes and a nut fitting on the thread of the collet for securing the collet on said removable cover and permitting adjustment of the collet along the optical axis.

6. An apparatus as claimed in claim 5 having a negative support, a film transport device supported by said negative support arranged between the illuminating head and the support, locating pins provided on said negative support, bores in the support for receiving said locating pins, an interchangeable pressure plate for holding the negative and keeping it flat, a base plate of the apparatus, a movable handle provided on said base plate, a lever provided on said film transport, a detachable coupling connector attached to said lever and a cable with an outer cover connected between said detachable coupling connector and said movable handle so that the film transport device can be operated remotely by actuation of said movable handle.

7. An apparatus as claimed in claim 6 having a transport slide provided on said film transport device, a spring against which the transport slide is urged when the latter is being operated, a film claw, a further spring arranged beneath the film claw so that it urges the film claw into engagement with perforations of the film, control parts and control pins which when the film transport device is operated, raises the pressure plate of the film.

8. An apparatus as claimed in claim 7 having a hinge pin arranged along one side of the pressure plate, grooved bearings provided in the negative support for receiving the hinge pin, bolts for retaining the hinge pin in the grooved bearings and clamp screws passing through bores provided in said bolts so that said bolts can be pivoted about the clamp screws to release the hinge pin from the grooved bearings.

9. An apparatus as claimed in claim 8 having orifices provided, in line, in the bottom of the illuminating head, the negative support, the transport slide and the support at a predetermined distance to one side of the optical axis of the apparatus, a mirror, inclined at an angle of 45°, mounted on the support beneath the orifice therein so that the negative in line with these common orifices is illuminated by the light emanating from the lamp through the orifice in the bottom of the illuminating head and can be viewed through the orifices provided in the negative support, the transport slide and the support by means of the mirror.

No references cited.

NORTON ANSHER, *Primary Examiner.*

JOHN M. HORAN, *Examiner.*

H. H. FLANDERS, R. A. WINTERCORN,
*Assistant Examiners.*